April 21, 1936.　　A. A. GILLET　　2,037,972
CINEMATOGRAPH APPARATUS
Filed Jan. 19, 1934　　5 Sheets-Sheet 3
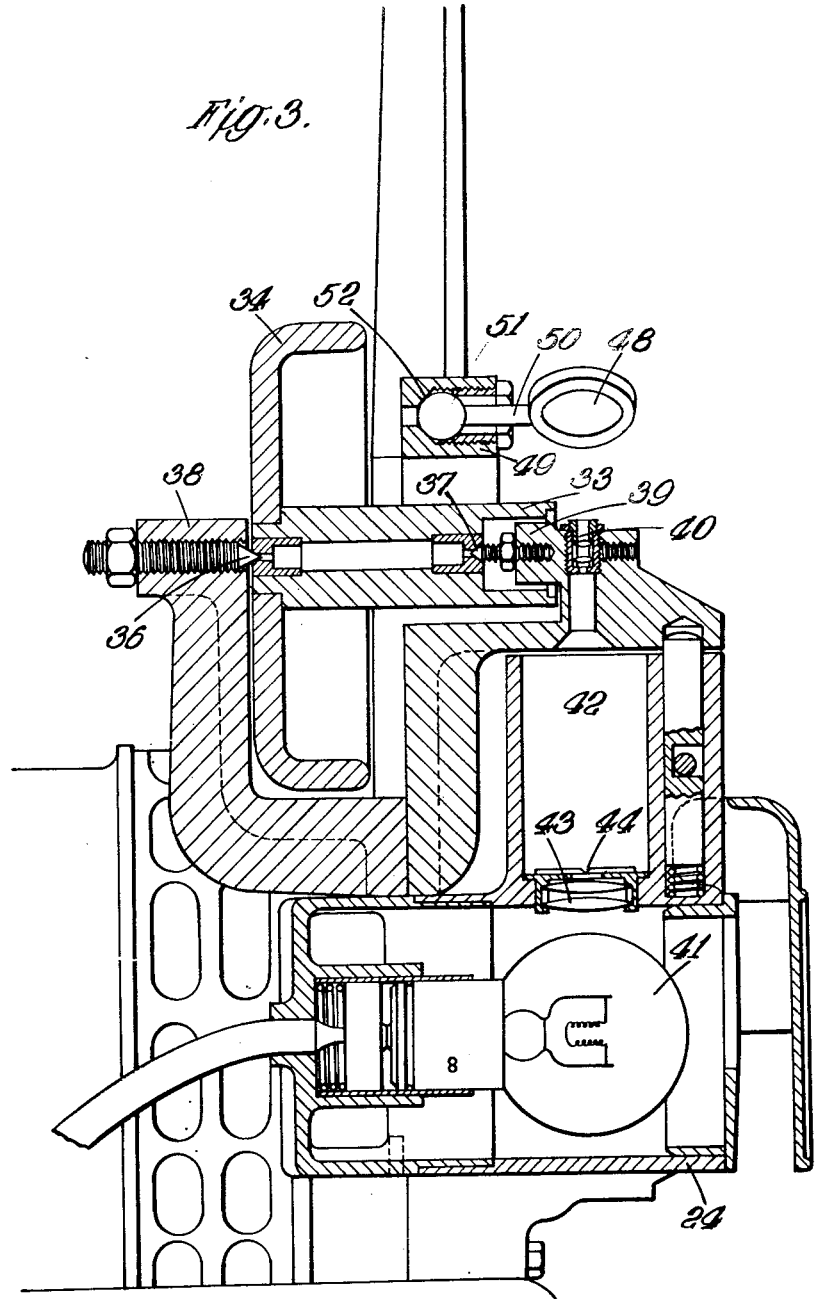
INVENTOR
ANDRE AUGUSTE GILLET
BY Haseltine Lake & Co.
ATTORNEYS

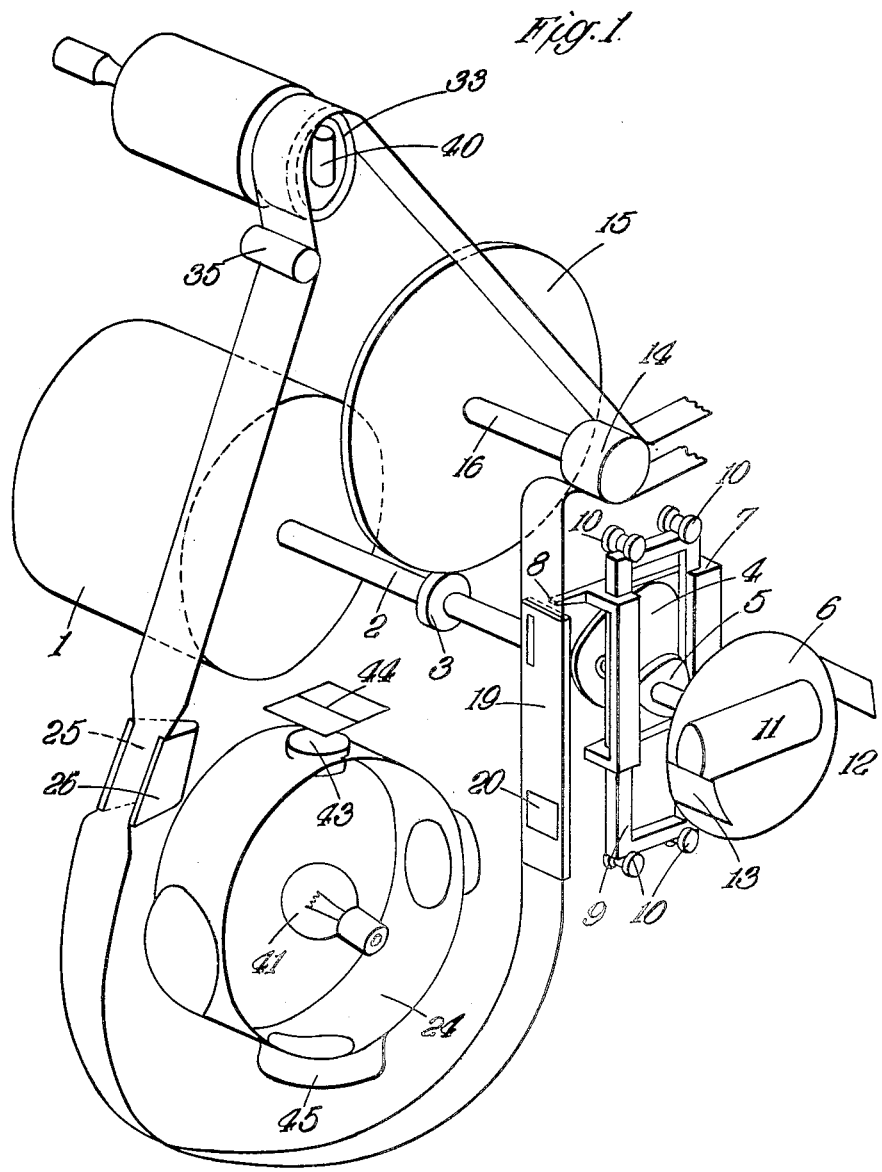

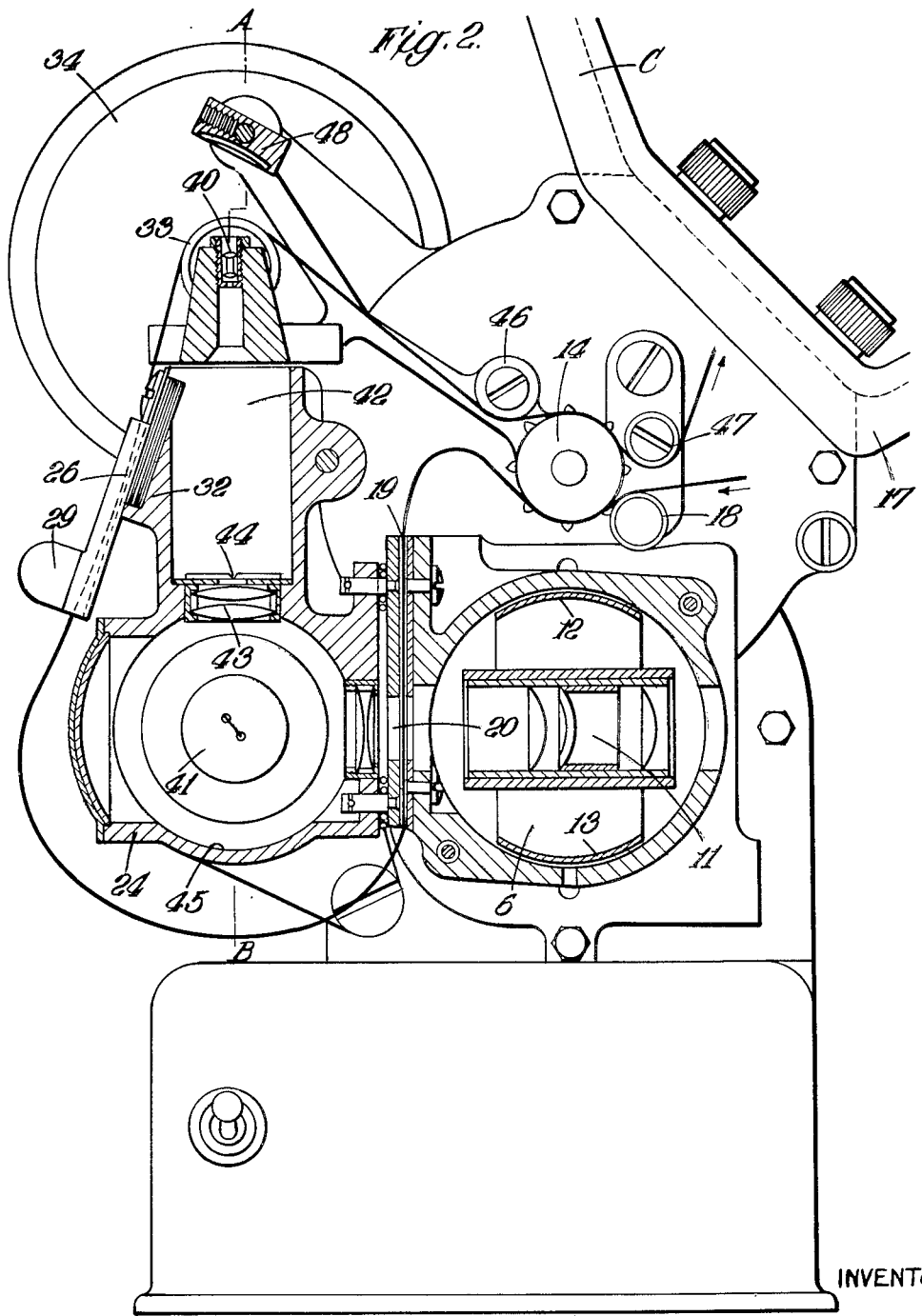

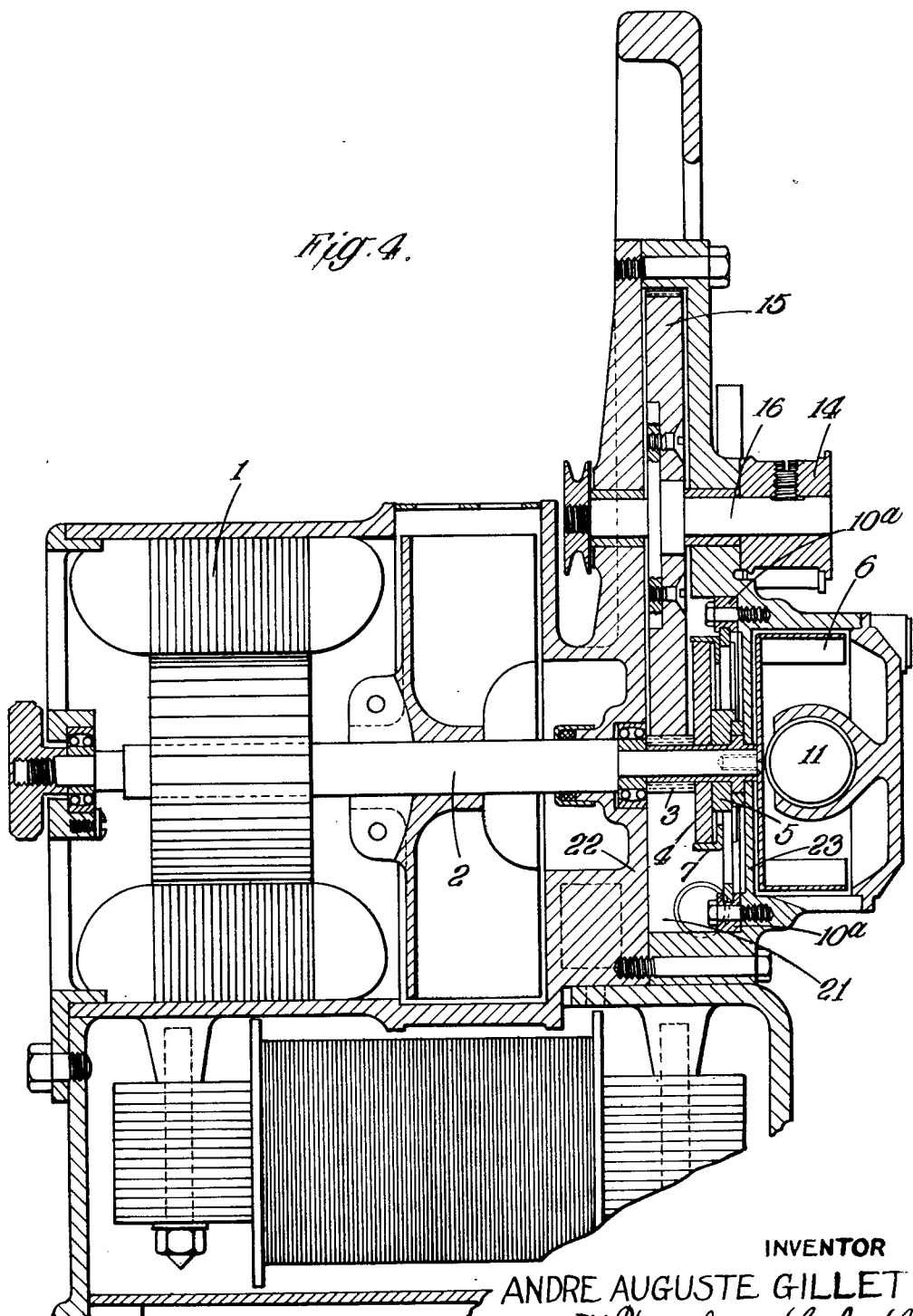

April 21, 1936.  A. A. GILLET  2,037,972
CINEMATOGRAPH APPARATUS
Filed Jan. 19, 1934   5 Sheets-Sheet 5
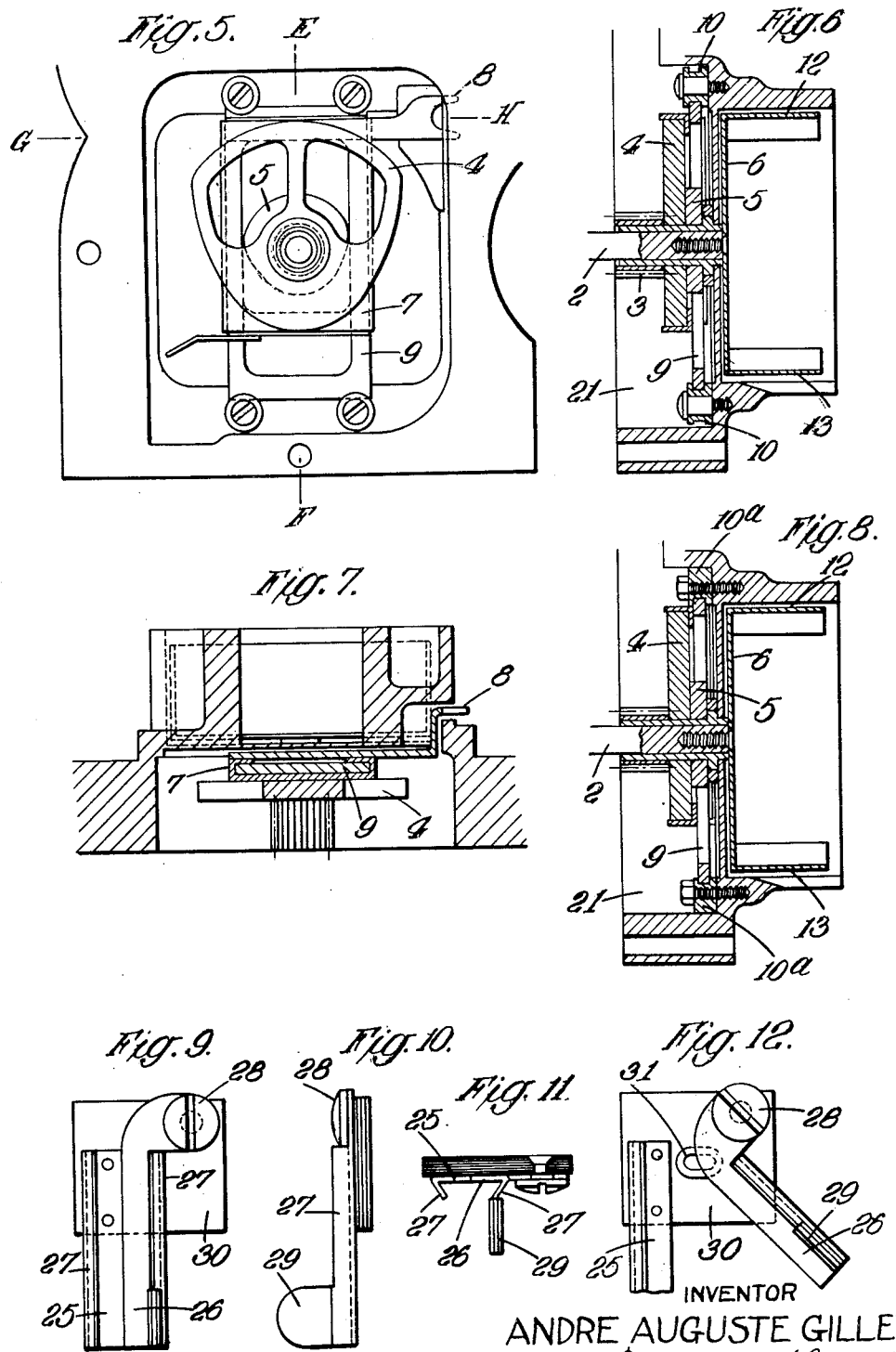
INVENTOR
ANDRE AUGUSTE GILLET
BY Haseltine Lake & Co.
ATTORNEYS Patented Apr. 21, 1936

2,037,972

UNITED STATES PATENT OFFICE 2,037,972

CINEMATOGRAPH APPARATUS

André Auguste Gillet, Paris, France, assignor to Societe Pour L'Exploitation Des Brevets A. G. L., Paris, France Application January 19, 1934, Serial No. 707,234
In France January 27, 1933

1 Claim. (Cl. 88—16.2)

This invention relates to cinematograph apparatus for the projection of pictures and reproduction of sound from sound films and especially to apparatus intended more particularly for home use which consequently has to be made as small and compact as possible.

It has hitherto been the usual practice to construct the sound reproducing and picture projection apparatus separately and to connect the two units together mechanically but such a method had the disadvantage that the apparatus was cumbersome and expensive and necessitated the use of a complicated train of gears for feeding the film through the picture gate and sound gate, an extremely delicate transmission of motion being necessary between these two parts of the apparatus to ensure synchronism between picture projection and sound reproduction.

In one or two individual cases attempts have been made to combine the picture projection apparatus and sound reproducing apparatus as a self-contained portable unit and in some cases it has been proposed to utilize the same source of light for picture projection and sound reproduction but in all such cases the mechanism for feeding the film through the picture gate and the mechanism for feeding the film through the sound gate were spaced relatively widely apart, thereby rendering their connection by means of a simple train of gears impracticable.

The chief object of the invention is to provide a combined cinematograph projection and sound reproduction apparatus for the projection of sound films of a generally improved and compact construction and in which the transmission mechanism for feeding the film through the picture projection gate and sound gate will be as simple as possible.

Referring to the drawings:

Figure 1 represents a diagrammatic view illustrating the main component parts of a cinematograph projection apparatus according to the invention.

Figure 2 represents a longitudinal vertical section taken through the projection lamp housing and objective mounting.

Figure 3 represents a transverse vertical section on the line A—B in Figure 2.

Figure 4 represents a transverse vertical section on the line C—D in Figure 2.

Figure 5 represents in front elevation the film penetration claw and its associated mechanism.

Figure 6 represents a vertical section on the line E—F in Figure 5.

Figure 7 represents a transverse section on the line G—H in Figure 5.

Figure 8 represents a section similar to Figure 6 but illustrating a modified construction.

Figure 9 represents a front elevation of the film guiding and damping device in its closed position.

Figure 10 is a side elevation thereof.

Figure 11 is a plan view.

Figure 12 is a front elevation showing the parts in the open position.

In the construction shown by the accompanying drawings the apparatus is operated by means of an electric motor 1 preferably of the synchronous or governed type, the motor having a driving shaft 2 to which is secured a pinion 3, a cam 4 for drawing down the film through the medium of a claw, a further cam 5 for controlling the penetration of the claw into the perforations in the film, and the shutter 6. The claw 8 is carried by a carriage 7, the carriage being given a vertical reciprocating movement by means of the cam 4, the length of movement corresponding to the distance between the axes of the images on the film. Figures 5 to 8 illustrate the carriage in detail. The carriage 7 is slidable vertically upon a member 9 which is itself slidable in a horizontal direction under the action of the cam 5, movement of the carriage horizontally in the one direction causing the claw to enter the perforations in the film, movement of the carriage in the opposite direction resulting in the withdrawal of the claw from the perforations. The member 9 moves horizontally either on flanged rollers 10 whose supporting shafts are fixed in the frame of the apparatus as in Figures 1, 5, 6, and 7, or between two guides 10a of bronze or other suitable material as in Figures 4 and 8. The objective 11 for the projection of the image on to the screen is securely located upon the frame of the apparatus as shown in Figures 2 and 4 in such a manner that the shutter 6 in rotating presents its blades 12 and 13 over the apertures of the objective 11 in order to obscure the light rays half in front of and half behind the objective.

The film is driven by means of a toothed sprocket wheel or roller 14, the toothed sprocket being driven from the main driving shaft 2 through the medium of a gear wheel 15 engaging the pinion 3 and carried by the shaft 16 (see Figures 1 and 4). The film passes from the full spool (not shown) which is carried by the arm 17 (see Figure 2) into engagement with the lower part of the toothed sprocket wheel 14, a roller 18 being provided for maintaining the film in engagement therewith. The film then enters the gate or projection passage 19 where it is periodically held stationary. The claw 8 engages in the perforation of the film above the projection window 20 and exerts a downward pressure on the film, thereby moving the film downwardly with an intermittent motion. The claw 8 is disposed at the upper end of the member 7 and this arrangement enables the principal parts of the claw operating mechanism to work in an oil bath, the oil being contained in the space 21 between the flange 22 of the motor casing and a partition 23 disposed between the cam 5 and shutter 6.

The film leaves the projection passage 19 at its lower end and passes around the projection lamp housing 24, the film then passing upwardly and entering a guiding and damping device which engages the edges of the film. The guiding and damping device which is shown in detail in Figures 9 to 12 consists of two substantially flat members 25 and 26 having flanged edges 27, the member 25 being fixed and the member 26 pivotally mounted about the axis of a pivot pin 28. The member 26 is provided with a thumb-piece or projection 29 to enable the member 26 to be turned about its pivot pin into the position shown in Figure 12 to enable the film to be inserted in the channel shaped guides formed by the flanged edges 27, the member 26 being then brought closer to the member 25, as in Figure 9, so that the guide path for the film is less than the width of the film, the film being thereby gripped at its edges. The base 30 carrying the members 25 and 26 may be displaced transversely relative to the length of the film for the purpose of accurately adjusting the position of the sound track on the film relatively to the sound recording mechanism. For this purpose, the base 30 is provided with a slot-like opening 31 through which may be passed a securing screw or bolt located in the part 32 of the frame of the apparatus.

The film, after leaving the guiding and damping device, passes over a speed regulating roller 33 carrying a fly-wheel 34, wherewith the speed of the roller is maintained substantially constant. If desired, a loose or jockey roller 35 (see Figure 1) may be interposed between the damping device and speed regulating roller for the purpose of increasing the length of film in contact with the speed regulating roller. The speed regulating roller and its associated fly-wheel are freely mounted between bearing points 36 and 37 located in the parts 38 and 39 of the frame of the apparatus, as shown in Figure 3.

An optical reducing system 40 of relatively small size is mounted within the part 39 of the frame, the film being so arranged in relation to the speed regulating roller that the edge of the film carrying the sound track projects beyond the end of the roller, so that the sound track lies directly above the axis of the optical reducing system 40.

The beam of light for the exploration of the sound track is derived from the projection lamp 41 which is disposed within the projection lamp housing 24, the housing having at its upper end a vertically disposed branch passage 42, at the lower end of which is disposed a system of lenses 43 forming a condenser, above which is situated a diametrically arranged slot 44 formed conveniently by means of two plates having their adjacent edges spaced apart slightly, and through which a beam of light from the projection lamp is directed upwardly on to the sound track after passing through the reducing optical system 40.

The lamp housing may be provided with a reflector 45 at its lower end for increasing the strength of illumination of the sound track.

The axis of the projection lamp 41 is disposed horizontally and at right-angles to the axis of projection of the image on to the screen, the filament of the lamp being disposed at the point of intersection of the axis of projection and the axis of the light rays directed vertically upwardly on to the sound track.

After leaving the speed regulating roller 33 the film passes over the upper surface of the toothed sprocket roller 14, as shown in Figures 1 and 2, idler rollers 46 and 47 being provided on each side of the sprocket roller 14 to maintain the film in driving engagement with the roller 14.

The photo-electric cell for receiving the light rays modulated by the sound track is situated externally of the apparatus and may be mounted in any convenient position. For example, the photo-electric cell may be carried by or associated with a reflector 48 adjustably mounted upon an upwardly projecting arm 49, and from which reflector the light rays may be reflected on to the photo-electric cell. Alternatively, a prism may take the place of the reflector, and through which the light rays may be refracted on to the cell, or the cell may be so arranged that the light rays impinge directly on to the cell. If a reflector or prism is provided it may conveniently be carried by a rod or member 50 having a ball end 51 adjustably mounted within a bearing 52 formed in the arm 49.

It will be readily apparent from the foregoing description that the combined cinematograph and sound reproducing apparatus according to the invention comprises a single self-contained unit, whilst the film driving mechanism is of a simple construction and due to the provision of the oil bath, in which the chief moving parts work, the efficient lubrication of such parts is ensured. The apparatus is applicable either for use with standard film or film of smaller size, such as, for example, with film having a width of sixteen millimetres, in which case the apparatus forms an extremely compact combined cinematograph and sound reproducer suitable for home use.

What I claim and desire to secure by Letters Patent of the United States is:—

In cinematograph apparatus for the projection of pictures and reproduction of sound from sound films, a casing, a picture gate, a sound gate, an optical system associated with said picture gate, a further optical system associated with said sound gate, the axes of said optical systems being disposed perpendicular to each other, a common lamp for illuminating said picture gate and said sound gate, said lamp being situated at the intersection of the axes of said optical systems, a driving shaft, means for rotating said driving shaft, bearings for said driving shaft in said casing, a film engaging claw imparting an intermittent motion to the film through said picture gate, cams rigidly secured to said driving shaft operating said claw, a shutter rigidly secured to said driving shaft and revolving about the optical system associated with the picture gate, a pinion rigidly secured to said driving shaft, a driven shaft, a gear wheel rigidly secured to said driven shaft in driving engagement with said pinion, a toothed sprocket rigidly secured to said driven shaft engaging the film to feed said film to said picture gate and to draw said film past said sound gate with a continuous uninterrupted motion, a freely revolving roller supporting the film at the point where it passes the sound gate and rotatable by contact of the film therewith for damping out fluctuations in the speed of the film at the point where it passes said sound gate and non-rotatable film guiding and damping means frictionally engaging the edges of the film prior to passing the sound gate for assisting in damping out fluctuations in the speed of the film prior to passing said sound gate and maintaining the film in contact with said roller.

ANDRÉ AUGUSTE GILLET.